United States Patent
Hwang et al.

(10) Patent No.: US 6,798,847 B2
(45) Date of Patent: Sep. 28, 2004

(54) TRANSMIT ANTENNA DIVERSITY APPARATUS AND METHOD FOR A BASE STATION IN A CDMA MOBILE COMMUNICATION SYSTEM

(75) Inventors: Jong Yoon Hwang, Sungnam (KR); Sung Jin Kim, Suwon (KR); Ju Ho Lee, Suwon (KR); Yong Suk Lee, Suwon (KR)

(73) Assignee: Samsung Electronics Co., Ltd. (KR)

(*) Notice: Subject to any disclaimer, the term of this patent is extended or adjusted under 35 U.S.C. 154(b) by 444 days.

(21) Appl. No.: 10/029,757

(22) Filed: Dec. 21, 2001

(65) Prior Publication Data

US 2002/0115473 A1 Aug. 22, 2002

(30) Foreign Application Priority Data

Dec. 21, 2000 (KR) ........................................ 2000-79713

(51) Int. Cl.[7] ............................................... H04L 27/04
(52) U.S. Cl. ...................................... 375/299; 370/342
(58) Field of Search ................................ 375/299, 295, 375/347, 315, 130, 146; 370/342, 335, 320, 441, 345; 455/101, 103

(56) References Cited

U.S. PATENT DOCUMENTS 6,480,481 B1 * 11/2002 Park et al. ................. 370/342
6,529,496 B1 * 3/2003 Yeom et al. ................. 370/345
6,603,735 B1 * 8/2003 Park et al. ................... 370/208
6,621,809 B1 * 9/2003 Lee et al. .................... 370/335

* cited by examiner

Primary Examiner—Khai Tran
(74) Attorney, Agent, or Firm—Dilworth & Barrese, LLP (57) ABSTRACT

Disclosed is a base station transmission apparatus in a mobile communication system using transmit antenna diversity between a base station with a plurality of antennas and a mobile station. A modulator generates a complex symbol in response to a coded symbol. A first spreader generates a plurality of different complex symbols in response to the complex symbol, and generates a plurality of first spread complex symbols by spreading the generated complex symbols with a first orthogonal code assigned to the mobile station. A second spreader generates a plurality of same complex symbols in response to the complex symbol from the modulator, spreads the same complex symbols with a second orthogonal code, and generates a plurality of second spread complex symbols by multiplying the spread complex symbols by weights for the antennas, determined based on feedback information indicating reception status of a base station signal. A summer sums up the first complex symbols and the second complex symbols. Finally, a transmitter complex-spreads an output of the summer, shifts the complex-spread signals to a radio frequency band, and transmits the shifted signals through the antennas.

19 Claims, 10 Drawing Sheets

<PRIOR ART>

TRANSMIT ANTENNA DIVERSITY APPARATUS AND METHOD FOR A BASE STATION IN A CDMA MOBILE COMMUNICATION SYSTEM

PRIORITY

This application claims priority to an application entitled "Transmit Antenna Diversity Apparatus and Method for Base Station in a CDMA Mobile Communication System" filed in the Korean Industrial Property Office on Dec. 21, 2000 and assigned Serial No. 2000-79713, the contents of which are hereby incorporated by reference.

BACKGROUND OF THE INVENTION

1. Field of the Invention

The present invention relates generally to a communication apparatus and method in a CDMA (Code Division Multiple Access) mobile communication system, and in particular, to a forward transmit antenna diversity apparatus and method in a CDMA mobile communication system.

2. Description of the Related Art

An existing CDMA mobile communication system that mainly supports voice service, has been developed into a future (CDMA mobile communication system which provides high-speed data service as well as voice service. The future CDMA mobile communication system supports voice, moving image and Internet search services. In the mobile communication system, communication links existing between a base station and a mobile station are classified into a forward link for transmitting a signal from the base station to the mobile station, and a reverse link for transmitting a signal from the mobile station to the base station.

The mobile communication system must resolve a fading problem in order to transmit high-speed data. The fading causes a reduction in the amplitude of a received signal from several dB to several tens dB. In order to solve the fading problem, a variety of diversity techniques are used.

One of the techniques used in the CDMA system employs a Rake receiver, which receives a signal on a diversity basis using delay spread of a channel and the Rake receiver supports a reception diversity technique for receiving a multi-path signal. However, this diversity technique is disadvantageous in that it is not operable when the delay spread is low in level.

Also, a time diversity technique utilizing interleaving and coding is used in a Doppler spread channel. However, this technique is not effective in a low-speed Doppler spread channel. It is possible, though, to effectually solve the fading problem using a space diversity technique, in an indoor channel with a low Doppler spread level and a pedestrian channel, a low-speed Doppler channel.

The space diversity technique uses two or more antennas. In this technique, even though a signal transmitted through one antenna is attenuated due to the fading, it is possible to compensate for the attenuation using a signal transmitted through the other antennas. The space antenna diversity technique is divided into a reception antenna diversity using a plurality of reception antennas and a transmit (transmission) antenna diversity using a plurality of transmission antennas. It is hard to install the reception antenna diversity in the mobile station in light of its size and cost. Thus, the use of the transmit antenna diversity for the base station is recommended.

The transmit antenna diversity includes a "closed loop transmit diversity" transmitting a signal based on forward channel information fed back from the mobile station, and an "open loop transmit diversity" receiving no feedback information from the mobile station. In the closed loop transmit diversity scheme, the base station applies weights to transmission signals of the respective transmission antennas based on the channel information measured and fed back by the mobile station to maximize a signal-to-noise ratio (SNR) of an antenna at the mobile station. In the open loop transmit diversity scheme, the base station transmits the same signal through two quadrature (or orthogonal) paths without using the feedback information. The quadrature paths can be provided by time division, frequency division or code division.

Figure 1:
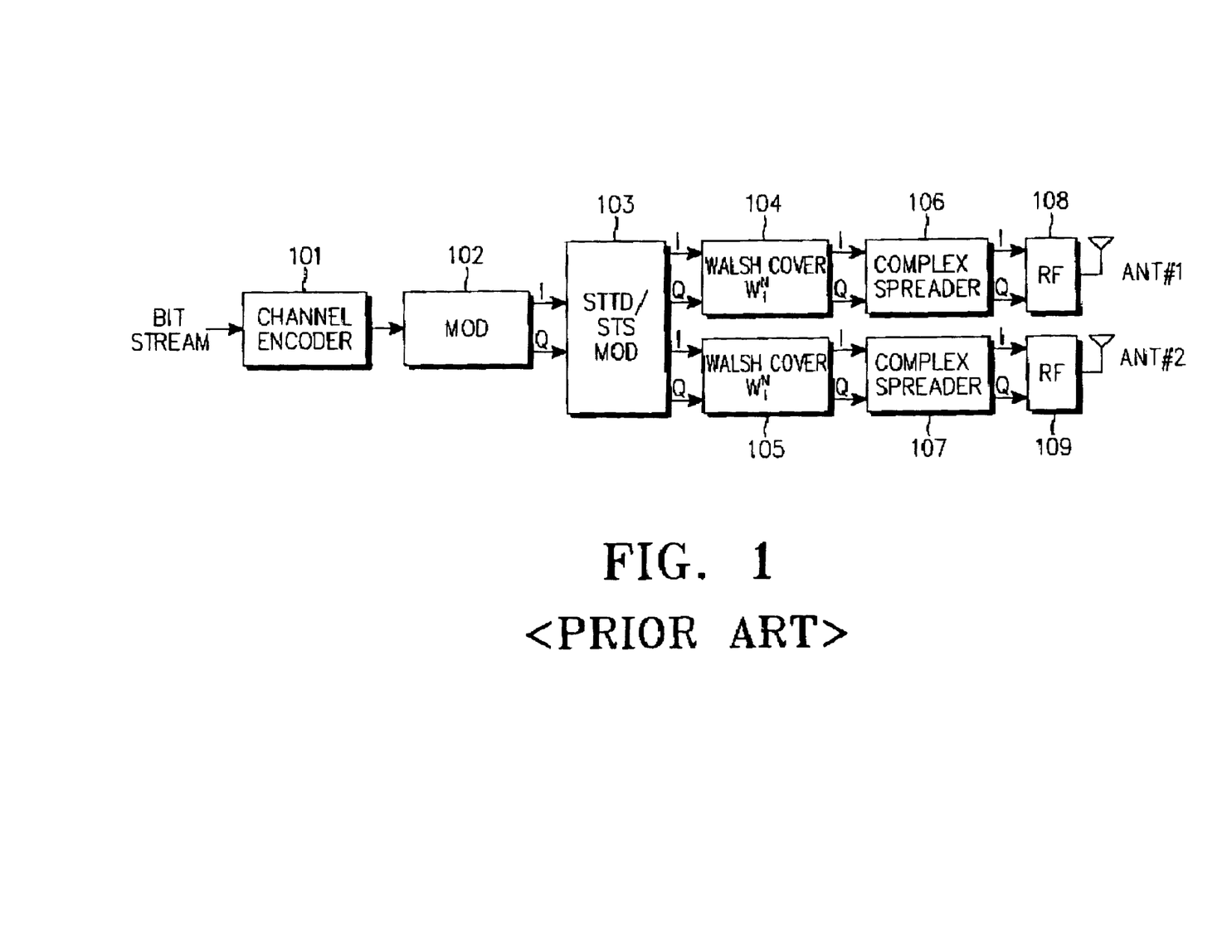
FIG. 1 illustrates a structure of a base station transmitter using an open loop transmit diversity scheme according to the prior art.
Figure 2:
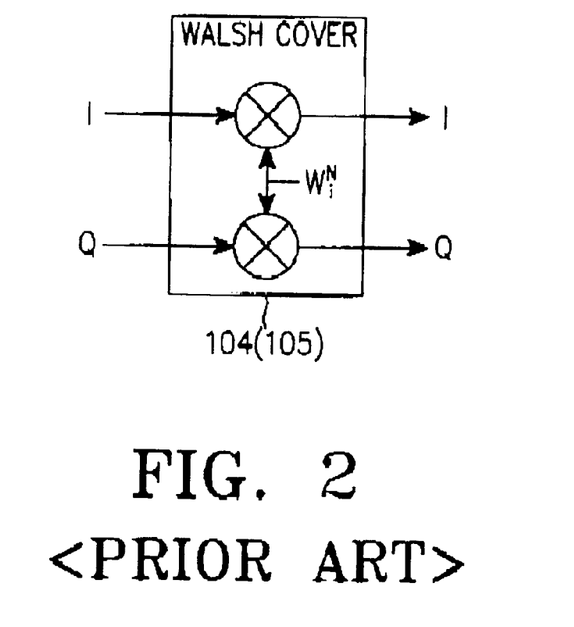
FIG. 2 illustrates a detailed structure of the Walsh cover part shown in FIG. 1.
Figure 3:
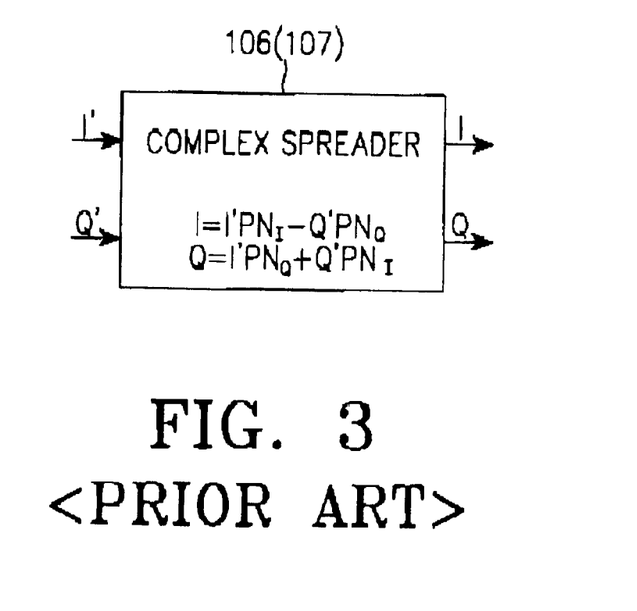
FIG. 3 illustrates a detailed operation of the complex spreader shown in FIG. 1.

FIG. 1 illustrates a structure of a base station transmitter using an open loop transmit diversity scheme according to the prior art. Referring to FIG. 1, an input bit stream is encoded by a channel encoder 101, and an output sequence of the channel encoder 101 is mapped into an M-ary symbol by an M-ary symbol modulator 102. The M-ary symbol modulator 102 serves as a QPSK (Quadrature Phase Shift Keying), 8-PSK (8-ary Phase Shift Keying) or 16-QAM (16-ary Quadrature Amplitude Modulation) modulator according to its data rate, and its modulation mode can be changed in a physical layer packet unit where the data rate can be changed. I and Q sequences of the M-ary symbol output from the M-ary symbol modulator 102 are modulated into two different complex symbols by an STTD/STS (Space-Time Transmit Diversity/Space Time Spreader) modulator 103. A detailed description of the STTD/STS modulator 103 will be made with reference to FIGS. 4 and 5. Walsh cover parts 104 and 105 orthogonally spread their input symbols using a Walsh orthogonal code $W^N_i$ assigned to the mobile station. A detailed structure of the Walsh cover parts 104 and 105 is illustrated in FIG. 2. The two complex symbols spread by the Walsh cover parts 104 and 105 are subject to complex spreading by their associated complex spreaders 106 and 107, respectively. An internal operation of the complex spreaders 106 and 107 is illustrated in FIG. 3. The output signals of the complex spreaders 106 and 107 are shifted to RF (Radio Frequency) band signals by associated RF parts 108 and 109, and then radiated through first and second antennas ANT1 and ANT2.

FIG. 2 illustrates a detailed structure of the Walsh cover parts 104 and 105 illustrated in FIG. 1. Each Walsh cover part 104 and 105 spreads its input complex symbol to a transmission bandwidth, using a Walsh code assigned to a transmission channel. FIG. 3 illustrates an internal operation of the complex spreaders 106 and 107 shown in FIG. 1. Each of the complex spreaders 106 and 107 complex-spreads its input complex signal into an I-channel (or I-arm) signal and a Q-channel (or Q-arm) signal, using a spreading sequence comprised of an I-channel spreading sequence $PN_I$ and a Q-channel spreading sequence $PN_Q$.

Figure 4:
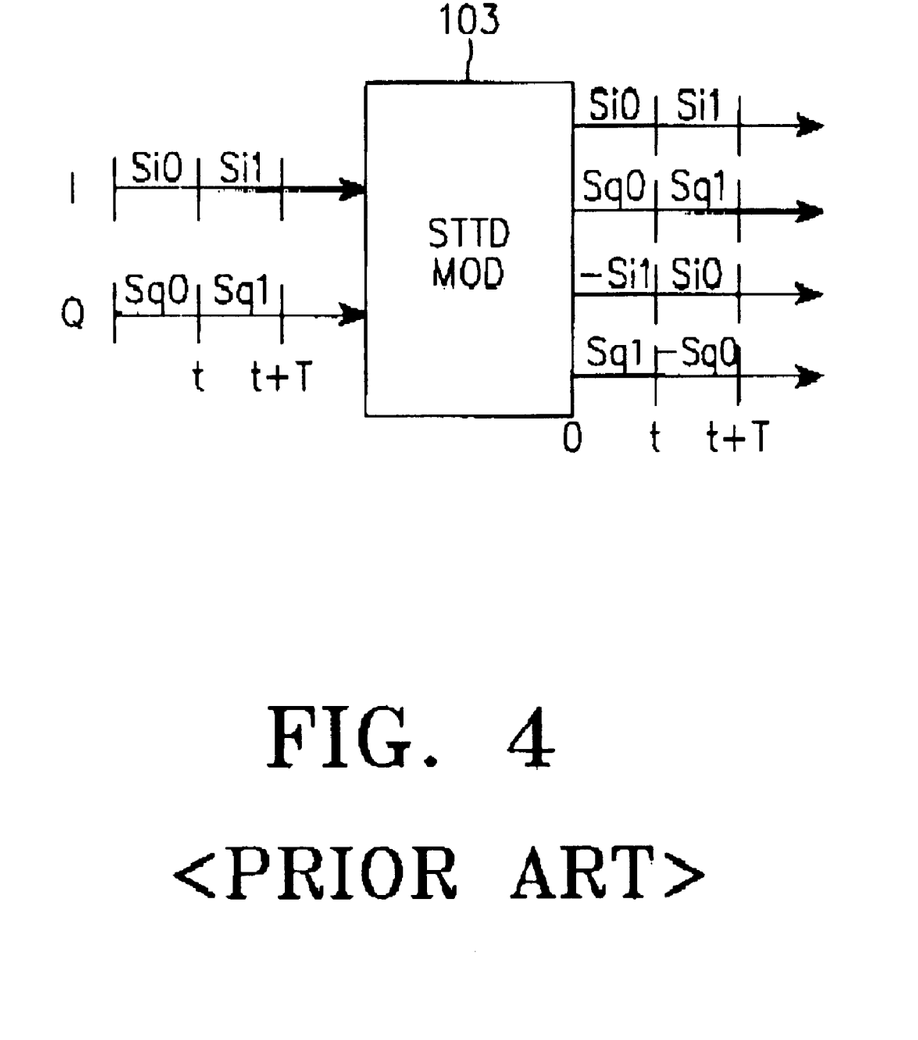
FIG. 4 illustrates an operation of a general STTD (Space-Time Transmit Diversity) modulator according to the prior art.

FIG. 4 illustrates an internal operation of the STTD/STS modulator 103 of FIG. 1 when it operates in an STTD (Space-Time Transmit Diversity) mode. In the STTD mode, the STTD/STS modulator 103 operates as shown in Table 1.

TABLE 1

|  | Input to | Antenna #1 | Antenna #2 |
|---|---|---|---|
| Time t | $S_0$ | $S_0$ | $-S^*_1$ |
| Time t + T | $S_1$ | $S_1$ | $S^*_0$ |

In Table 1, $S_0$ and $S_1$ represent complex symbols, and are represented by $$S_0 = Si_0 + jSq_0$$
$$S_1 = Si_1 + jSq_1$$

If symbols $S_0$ and $S_1$ are input to the STTD modulator 103 at a specific time t and a time t+T, respectively, then the STTD modulator 103 outputs the symbol $S_0$ for the first antenna ANT1 and a minus conjugate of the symbol $S_1$ for the second antenna ANT2 at the time t, and outputs the symbol $S_1$ for the first antenna ANT1 and a conjugate of the symbol $S_0$ for the second antenna ANT2 at the time t+T.

Figure 5:
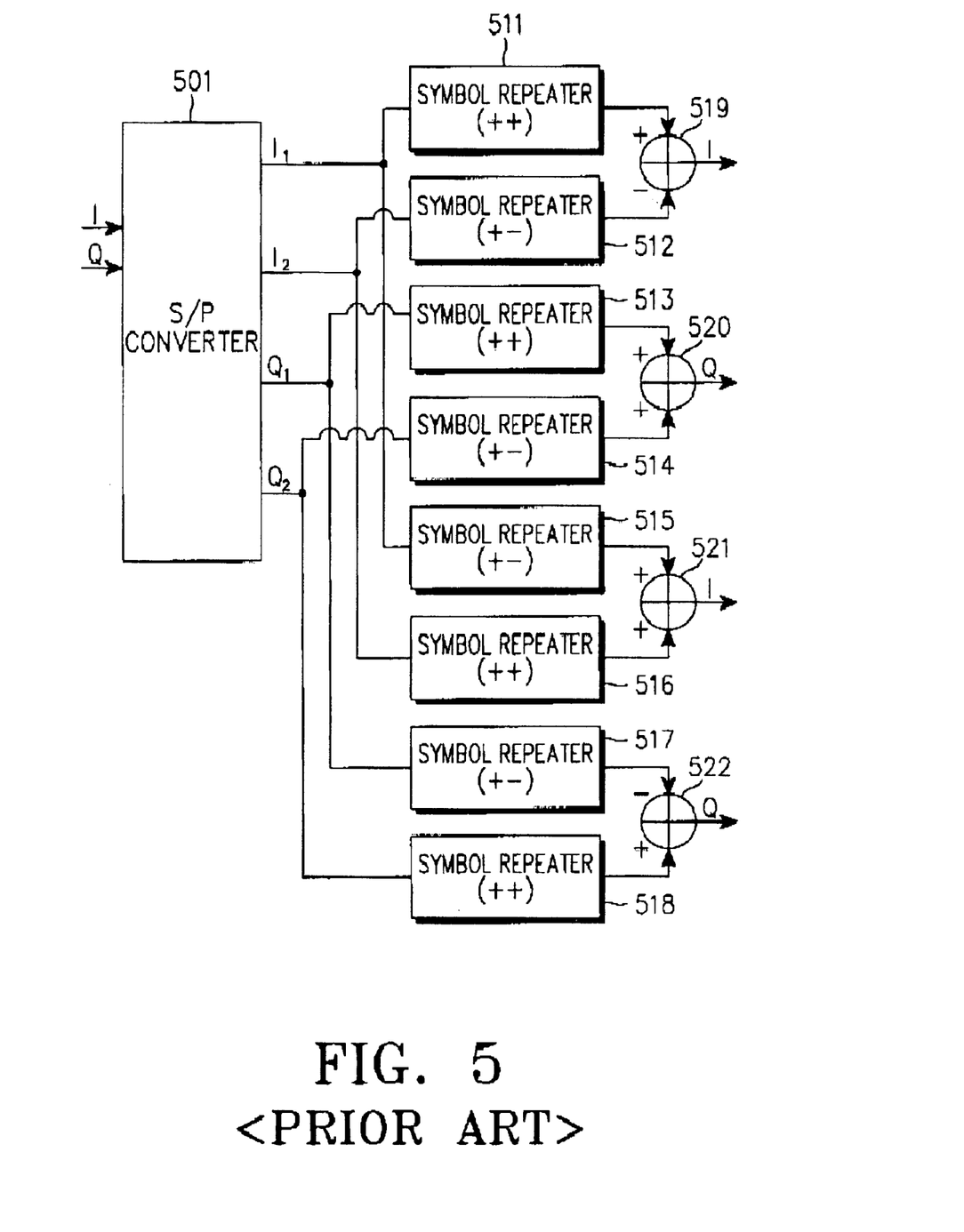
FIG. 5 illustrates an operation of a general STS (Space Time Spreader) modulator according to the prior art.

FIG. 5 illustrates an internal operation of the STTD/STS modulator 103 of FIG. 1 when it operates in the STS (Space Time Spreader) mode. Referring to FIG. 5, a serial-to-parallel (S/P) converter 501 converts each of its input complex symbols comprised of an I-phase symbol and a Q-phase symbol into two ½-rate complex symbols comprised of an I-phase symbol and a Q-phase symbol. The two complex symbols $I_1/Q_1$ and $I_2/Q_2$ are provided to symbol repeaters 511–518, where they are repeated. For example, the symbol $I_1$ is input to the symbol repeaters 511 and 515. The symbol repeater 511 (++) repeats the input symbol $I_1$, while the symbol repeater 515 (+–) repeats the input symbol $I_1$. The outputs of the symbol repeaters 511–518 are provided to four summers 519–522 and then converted to two complex symbols. Herein, the STTD/STS modulator will be referred to as a "diversity modulator" for simplicity.

Figure 6:
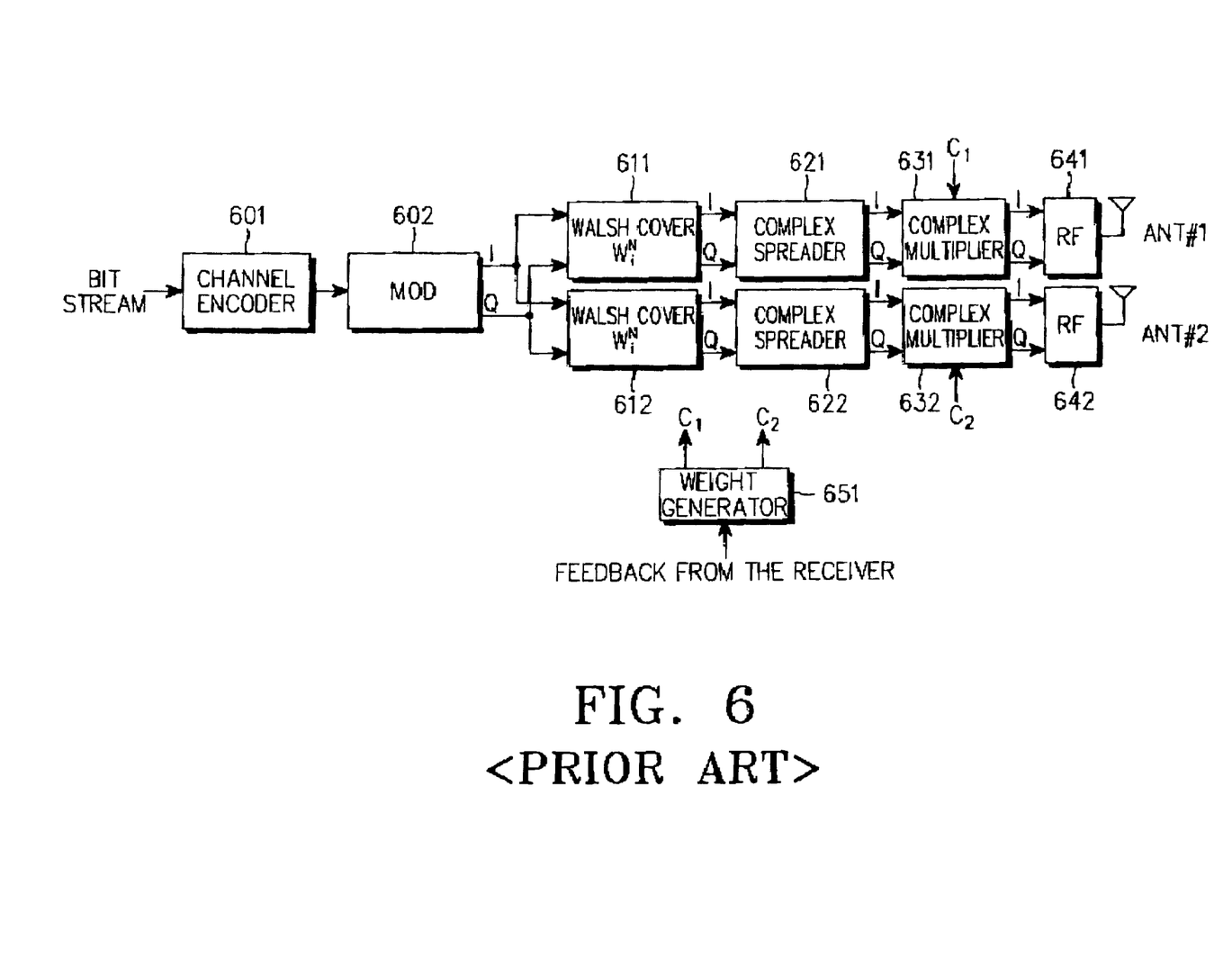
FIG. 6 illustrates a structure of a base station transmitter using a closed loop transmit diversity scheme according to the prior art.

FIG. 6 illustrates a structure of a base station transmitter using a closed loop transmit diversity scheme according to the prior art. Referring to FIG. 6, an input bit stream is encoded by a channel encoder 601, and an output sequence of the channel encoder 601 is mapped into an M-ary symbol by an M-ary symbol modulator 602. The outputs of the symbol modulator 602 are provided to both Walsh cover parts 611 and 612. That is, the I-phase output of the modulator 602 is provided to both the Walsh cover parts 611 and 612, and the Q-phase output of the modulator 602 is also provided to both the Walsh cover parts 611 and 612. The Walsh cover parts 611 and 612 orthogonally-spread by multiplying their input complex symbols by a Walsh code allocated to the mobile station. Complex spreaders 621 and 622 complex-spread the outputs of their associated Walsh cover parts 611 and 612. A weight generator 651 generates weights $C_1$ and $C_2$ to be applied to the respective antennas, based on forward channel information fed back from the mobile station. Here, the feedback information can be either phase-related information or amplitude-related information. Complex multipliers 631 and 632 multiply the outputs of their associated complex spreaders 621 and 622 by the weights $C_1$ and $C_2$ provided from the weight generator 651, respectively. The outputs of the complex multipliers 631 and 632 are modulated into RF band signals by RF parts 641 and 642, respectively, and then radiated through first and second antennas ANT1 and ANT2.

In IS-2000 Release A for the cdma2000 system, a common pilot channel is transmitted through a first antenna ANT1, while a diversity pilot channel is transmitted through a second antenna ANT2. The mobile station calculates weight information for the two antennas using the common pilot channel and the diversity pilot channel, and then transmits the calculated weight information to the base station. Then, the weight generator 651 in the base station creates the weights $C_1$ and $C_2$ based on the received weight information.

Comparing theoretical maximum performance of the transmit antenna diversity schemes, the closed loop transmit antenna diversity scheme of FIG. 6 is superior to the open loop transmit antenna diversity scheme of FIG. 1 by 3 dB in terms of SNR (signal-to-noise ratio) required to attain a given bit error rate (BER). However, in the case of a non-ideal, normal Doppler channel, the closed loop transmit diversity scheme cannot properly perform the transmit diversity due to delay of the feedback information in a high-speed fading channel environment where the mobile station moves at high speed, so it has lower performance than the open loop transmit diversity scheme. That is, in the environment where the mobile station moves at high speed, it is never possible to obtain a gain of the closed loop transmit diversity. Therefore, there is a demand for a transmit antenna diversity method capable of obtaining a diversity gain over the whole speed range, regardless of the moving speed of the mobile station.

SUMMARY OF THE INVENTION

It is, therefore, an object of the present invention to provide a base station transmission apparatus and method for obtaining a transmit antenna diversity gain over the whole speed range, regardless of a moving speed of a mobile station in a CDMA mobile communication system.

It is another object of the present invention to provide a base station transmission apparatus and method for enabling the combined use of a closed loop antenna diversity scheme and an open loop antenna diversity scheme in a CDMA mobile communication system.

It is yet another object of the present invention to provide a base station transmission apparatus and method for obtaining a gain of a closed loop transmit antenna diversity scheme in a fading channel environment where a mobile station has a low speed, and obtaining a gain of an open loop transmit antenna diversity scheme in a channel environment where the mobile station has a high speed, in a CDMA mobile communication system.

According to a first object of the present invention, a base station transmission apparatus in a mobile communication system using transmit antenna diversity between a base station with a plurality of antennas and a mobile station, comprises a modulator for generating a complex symbol in response to a coded symbol; a first spreader for generating a plurality of different complex symbols in response to the complex symbol from the modulator, and generating a plurality of first spread complex symbols by spreading the plurality of the generated complex symbols with a first orthogonal code assigned to the mobile station; a second spreader for generating a plurality of same complex symbols being different from the plurality of the complex symbols in response to the complex symbol from the modulator, spreading the plurality of the same complex symbols with a second orthogonal code being different from the first orthogonal code, and generating a plurality of second spread complex symbols by multiplying the spread complex symbols by weights for the antennas, determined based on feedback information, received from the mobile station, indicating reception status of a base station signal; a summer for summing up the first complex symbols from the first spreader and the second complex symbols from the second spreader; and a transmitter for complex-spreading an output of the summer, shifting the complex-spread signals to a radio frequency band, and transmitting the shifted signals through the antennas.

According to a second object of the present invention, a base station transmission apparatus in a mobile communication system using transmit antenna diversity between a base station with a plurality of antennas and a mobile station, comprises a modulator for generating a complex symbol in response to a coded symbol; a serial-to-parallel converter for outputting two complex symbols with a reduced symbol rate by demultiplexing the complex symbol from the modulator; a first spreader for generating a plurality of different complex symbols in response to one complex symbol from the serial-to-parallel converter, and generating a plurality of first spread complex symbols by spreading the plurality of the complex symbols with a first sub-orthogonal code created from one orthogonal code assigned to the mobile station; a second spreader for generating a plurality of same complex symbols being different from the plurality of the complex symbols in response to another complex symbol from the serial-to-parallel converter, spreading the plurality of the same complex symbols with a second sub-orthogonal code being different from the first sub-orthogonal code, and generating a plurality of second spread complex symbols by multiplying the spread complex symbols by weights for the antennas, determined based on feedback information, received from the mobile station, indicating reception status of a base station signal; a summer for summing up the first complex symbols from the first spreader and the second complex symbols from the second spreader; and a transmitter for complex-spreading an output of the summer, shifting the complex-spread signals to a radio frequency band, and transmitting the shifted signals through the antennas.

According to a third object of the present invention, a base station transmission apparatus in a mobile communication system using transmit antenna diversity between a base station with a plurality of antennas and a mobile station, comprises a modulator for generating a complex symbol in response to a coded symbol; a diversity modulator for generating a plurality of different complex symbols in response to the complex symbol from the modulator; a Walsh cover part for generating a plurality of spread complex symbols by spreading the plurality of the complex symbols with an orthogonal code assigned to the mobile station; and a plurality of transmitters, a number of the transmitters being equal to a number of the complex symbols output from the Walsh cover part, for generating a plurality of complex symbols by multiplying one complex symbol from the Walsh cover part by weights for the antennas, determined based on feedback information, received from the mobile station, indicating reception status of a base station signal, complex-spreading the plurality of the complex symbols, shifting the complex-spread signals to a radio frequency band, and transmitting the shifted signals through the antennas associated with the weights.

According to a fourth object of the present invention, a base station transmission apparatus in a mobile communication system using transmit antenna diversity between a base station with a plurality of antennas and a mobile station, comprises a modulator for generating a complex symbol in response to a coded symbol; a diversity modulator for generating a plurality of different complex symbols in response to the complex symbol from the modulator; a spreader for generating a plurality of spread complex symbols by spreading the plurality of the complex symbols from the diversity modulator with an orthogonal code assigned to the mobile station; a switch for sequentially selecting the plurality of the complex symbols from the spreader in a given period; a complex multiplier for generating a plurality of weighted complex symbols by multiplying the complex symbol output from the switch by weights for the antennas, determined based on feedback information, received from the mobile station, indicating reception status of a base station signal; and a complex spreading and RF part for complex-spreading the plurality of the complex symbols from the complex multiplier, shifting the complex-spread signals to a radio frequency band, and transmitting the shifted signals through the antennas.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention combines a closed loop antenna diversity apparatus with an open loop antenna diversity apparatus capable of obtaining constant performance regardless of a speed of the mobile station. In a preferred embodiment of the present invention, the open loop antenna diversity apparatus compensates for performance deterioration of the closed loop antenna diversity apparatus due to high-speed movement of the mobile station, thereby to prevent abrupt performance deterioration.

Figure 7:
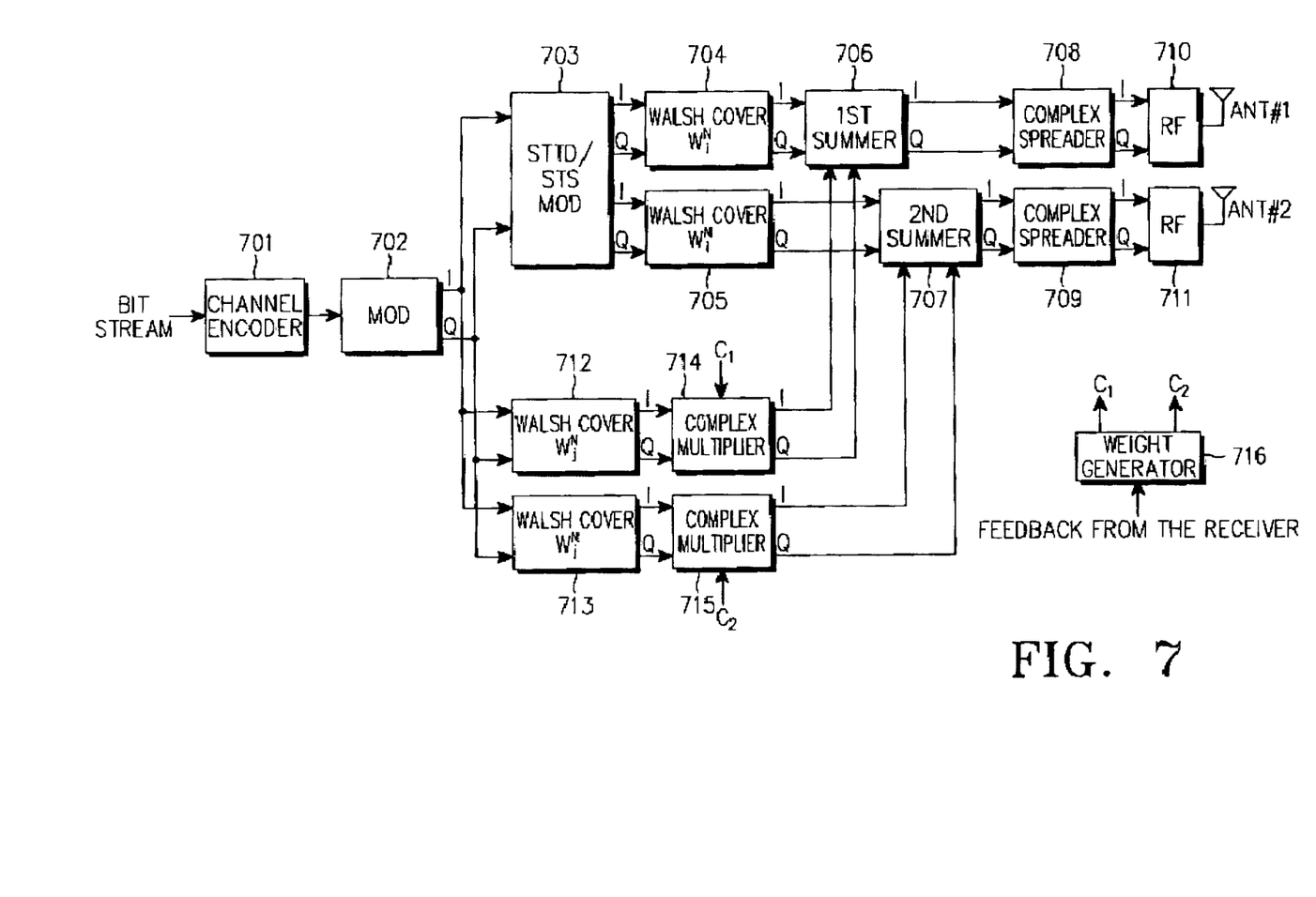
FIG. 7 illustrates a transmit antenna diversity apparatus with two antennas according to an embodiment of the present invention, in which two Walsh codes are assigned to a mobile station, and an open loop antenna diversity apparatus is connected in parallel with a closed loop antenna diversity apparatus.

FIG. 7 illustrates a base station transmission apparatus with two antennas according to an embodiment of the present invention, in which an open loop antenna diversity apparatus is connected in parallel with a closed loop antenna diversity apparatus so as to obtain both a gain of the open loop antenna diversity and a gain of the closed loop antenna diversity. As illustrated in FIG. 7, a channel transmitted by the open loop antenna diversity scheme is separated from a channel transmitted by the closed loop antenna diversity scheme by two different Walsh codes assigned to the mobile station.

Referring to FIG. 7, a channel encoder 701 encodes an input bit stream. A modulator 702 maps the coded symbols output from the channel encoder 701 into an M-ary complex symbol. Here, the modulator 702 serves as a QPSK, 8-PSK or 16-QAM modulator according to its data rate. An STTD/STS modulator (or diversity modulator) 703 modulates a complex symbol (I and Q sequences) output from the modulator 702 into two different complex symbols. The detailed operation of the STTD/STS modulator 703 has been described with reference to FIGS. 4 and 5. A Walsh cover part 704 spreads one complex symbol from the STTD/STS modulator 703 by multiplying it by a Walsh orthogonal code assigned to the mobile station. A Walsh cover part 705 spreads another complex symbol from the STTD/STS modulator 703 by multiplying it by the Walsh orthogonal code.

A weight generator 716 generates weights $C_1$ and $C_2$ to be applied to the two antennas, based on forward channel information fed back from the mobile station. Walsh cover parts 712 and 713 spread the complex symbol (I and Q sequences) output from the modulator 702 by multiplying them by a Walsh orthogonal code being different from the above Walsh orthogonal code assigned to the mobile station. A complex multiplier 714 multiplies the outputs of the Walsh cover part 712 by the weight $C_1$ from the weight generator 716, and a complex multiplier 715 multiplies the outputs of the Walsh cover part 713 by the weight $C_2$ from the weight generator 716.

A first summer (or Walsh chip level summer) 706 sums up the output of the Walsh cover part 704 and the output of the complex multiplier 714 in a Walsh chip level, and a second summer 707 sums up the output of the Walsh cover part 705 and the output of the complex multiplier 715 in a Walsh chip level. Complex spreaders 708 and 709 complex-spread the outputs of the first and second summers 706 and 707, respectively. The detailed operation of the complex spreaders 708 and 709 has been described with reference to FIG. 3. RF parts 710 and 711 shift the outputs of the associated complex spreaders 708 and 709 to an RF band. The shifted RF band signals are transmitted to the mobile station through their associated antennas.

An operation of the structure illustrated in FIG. 7 will be described below The coded symbols output from the channel encoder 701 are modulated into a complex symbol by the modulator 702. The complex symbols (I and Q sequences) output from the modulator 702 is simultaneously provided to a first spreading part and a second spreading part. The first spreading part is comprised of the STTD/STS modulator 703 and the Walsh cover parts 704 and 705, while the second spreading part is comprised of the Walsh cover parts 712 and 713 and the complex multipliers 714 and 715. The signals provided to the first and second spreading parts are multiplied by two Walsh codes $W^N_i$ and $W^N_j$ assigned to the mobile station, respectively, so that they are separated into two interference-free channels. Thereafter, the first summer 706 sums up the signals to be transmitted through a first antenna ANT1 among the output signals of the first and second spreading parts, while the second summer 707 sums up the signals to be transmitted through a second antenna ANT2 among the output signals of the first and second spreading parts. The outputs of the first and second summers 706 and 707 are subject to complex spreading by the complex spreader 708 and 709, and then shifted to an RF band through the RF parts 710 and 711. The shifted RF band signals are transmitted through the first and second antennas ANT1 and ANT2.

Figure 8:
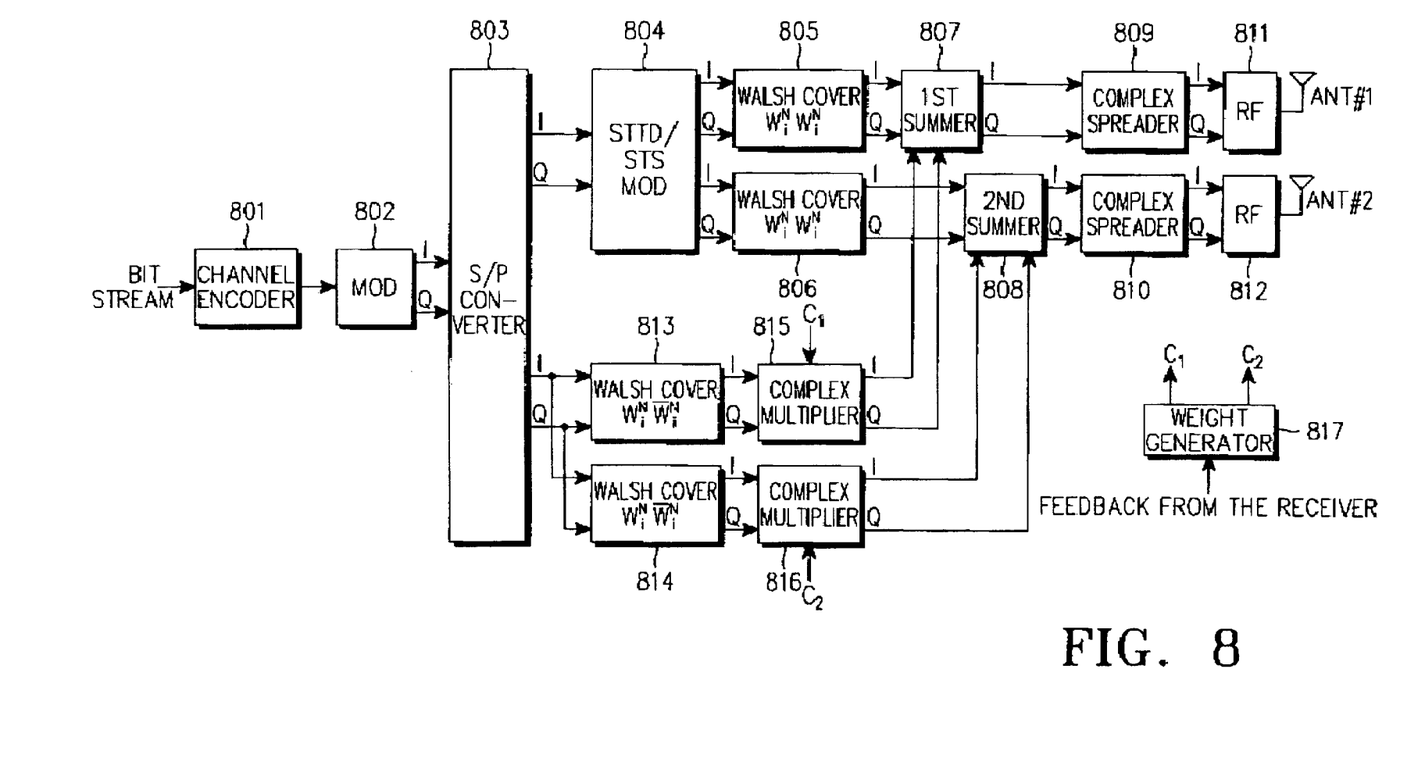
FIG. 8 illustrates a transmit antenna diversity apparatus with two antennas according to another embodiment of the present invention, in which one Walsh code is assigned to the mobile station, and the open loop antenna diversity apparatus is connected in parallel with the closed loop antenna diversity apparatus.

FIG. 8 illustrates a structure of a base station transmission apparatus with two antennas according to another embodiment of the present invention, in which an open loop antenna diversity apparatus is connected in parallel with a closed loop antenna diversity apparatus to obtain both a gain of the open loop antenna diversity and a gain of the closed loop antenna diversity. As illustrated in FIG. 8, a channel transmitted by the open loop antenna diversity scheme is separated from a channel transmitted by the closed loop antenna diversity scheme, using two sub-Walsh codes created from one Walsh code assigned to the mobile station.

Referring to FIG. 8, a channel encoder 801 encodes an input bit steam into coded symbols. A modulator 802 maps the coded symbols from the channel encoder 802 into an M-ary complex symbol. Here, the modulator 802 serves as a QPSK, 8-PSK or 16-QAM modulator according to its data rate. A serial-to-parallel (S/P) converter 803 separates the complex symbol output from the modulator 802 into two complex symbols.

Figure 9:
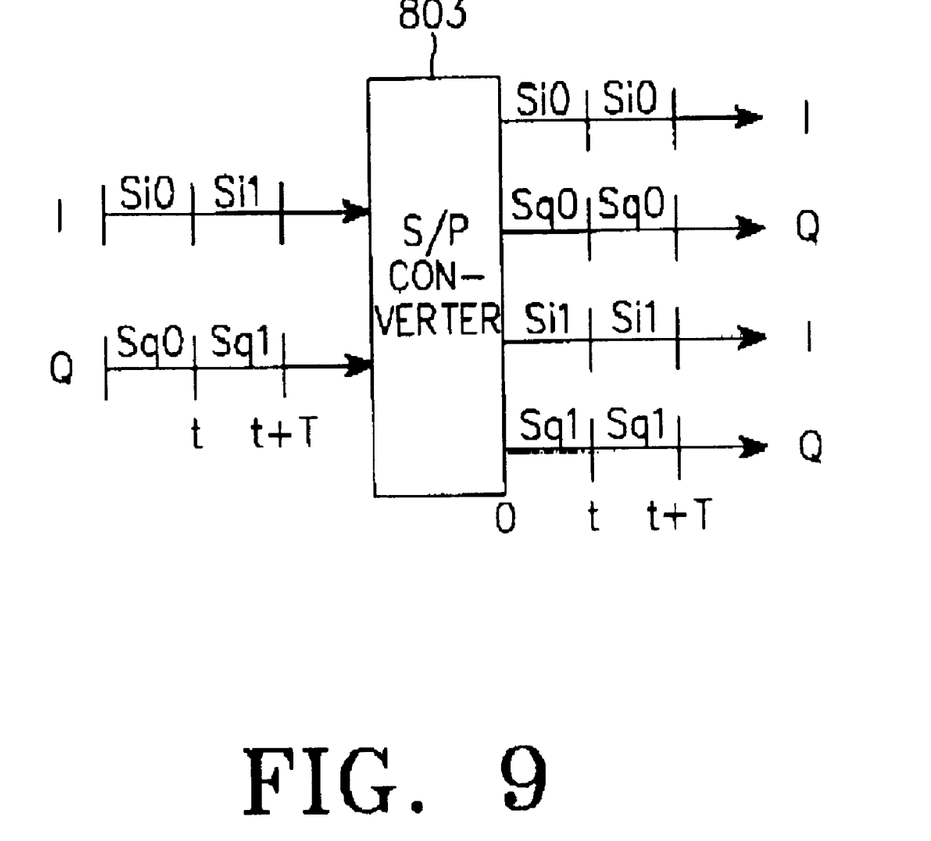
FIG. 9 illustrates a detailed operation of the serial-to-parallel converter shown in FIG. 8.

More specifically, as illustrated in FIG. 9, the serial-to-parallel converter 803 repeats twice a symbol Si0 received through an I channel and provides the repeated symbols to the first spreading part through the I channel, and also repeats twice a symbol Si1 received through the I channel and provides the repeated symbols to the second spreading part through the I channel. Further, the serial-to-parallel converter 803 repeats twice a symbol Sq0 received through a Q channel and provides the repeated symbols to the first spreading part through the Q channel, and also repeats twice a symbol $Sq_1$ received through the Q channel and provides the repeated symbols to the second spreading part through the Q channel. That is, the symbol streams provided to the respective spreading parts have ½ symbol rate, as compared with the input stream of the serial-to-parallel converter 803.

An STTD/STS modulator 804 modulates the complex symbol (I and Q sequences) output from the serial-to-parallel converter 803 into two different complex symbols. A detailed operation of the STTD/STS modulator 804 has been described with reference to FIGS. 4 and 5. A Walsh cover part 805 orthogonally spreads one complex symbol output from the STTD/STS modulator 803 by multiplying it by a first Walsh code out of two sub-Walsh codes created from one Walsh code assigned to the mobile station. A Walsh cover part 806 orthogonally spreads another complex symbol output from the STTD/STS modulator 803 by multiplying it by the first Walsh code.

For example, if it is assumed that a Walsh code $W^N_i$ with a length N is assigned to the mobile station, then two sub-Walsh orthogonal codes $W^N_i W^N_i$ and $W^N_i \overline{W^N_i}$ with a length 2N are created from the Walsh code $W^N_i$. Here, for a binary symbol $x \in \{-1,1\}$, $\overline{x} = -x$.

A weight generator 817 generates weights $C_1$ and $C_2$ to be applied to the respective antennas, based on forward channel information fed back from the base station. Walsh cover parts 813 and 814 orthogonally spread the complex symbol (I and Q sequences) output from the serial-to-parallel converter 803 by multiplying it by a second Walsh code out of the two sub-Walsh codes. Here, the first Walsh code used in the Walsh cover parts 805 and 806 is different from the second Walsh code used in the Walsh cover parts 813 and 814. A complex multiplier 815 multiplies the output of the Walsh cover part 813 by the weight $C_1$ from the weight generator 817, and the complex multiplier 816 multiplies the output of the Walsh cover part 814 by the weight $C_2$ from the weight generator 817.

A first summer (or Walsh chip level summer) 807 sums up the output of the Walsh cover part 805 and the output of the complex multiplier 815 in a Walsh chip level, and a second summer 808 sums up the output of the Walsh cover part 806 and the output of the complex multiplier 816 in a Walsh chip level. Complex spreaders 809 and 810 complex-spread the outputs of their associated summers 807 and 808. A detailed operation of the complex spreaders 809 and 810 has been described with reference to FIG. 3. RF parts 811 and 812 shift the outputs of the associated complex spreaders 809 and 810 to an RF band, and the shifted RF band signals are transmitted to the mobile station through the associated antennas ANT1 and ANT2.

An operation of the structure shown in FIG. 8 will be described below. The coded symbols output from the channel encoder 801 are modulated into a complex symbol by the modulator 802. The complex symbol output from the modulator 802 is divided into two complex symbols by the serial-to-parallel converter 803, reducing the symbol rate to ½. The two complex symbols are simultaneously provided to the first and second spreading parts. Here, the first spreading part includes the STTD/STS modulator 804 and the Walsh cover parts 805 and 806, while the second spreading part includes the Walsh cover parts 813 and 814 and the complex multipliers 815 and 816. The complex symbols provided to the first and second spreading parts are multiplied by the above stated Walsh codes, so that they are separated into interference-free two channels. Thereafter, the first summer 807 sums up the signals to be transmitted through the first antenna ANT1 among the outputs of the first and second spreading parts, and the second summer 808 sums up the signals to be transmitted through the second antenna ANT2 among the outputs of the first and second spreading parts. The outputs of the first and second summers 807 and 808 are subject to complex spreading by the complex spreaders 809 and 810, and then shifted to an RF band through the RF parts 811 and 812. The shifted RF band signals are transmitted through the first and second antennas ANT1 and ANT2.

Figure 10:
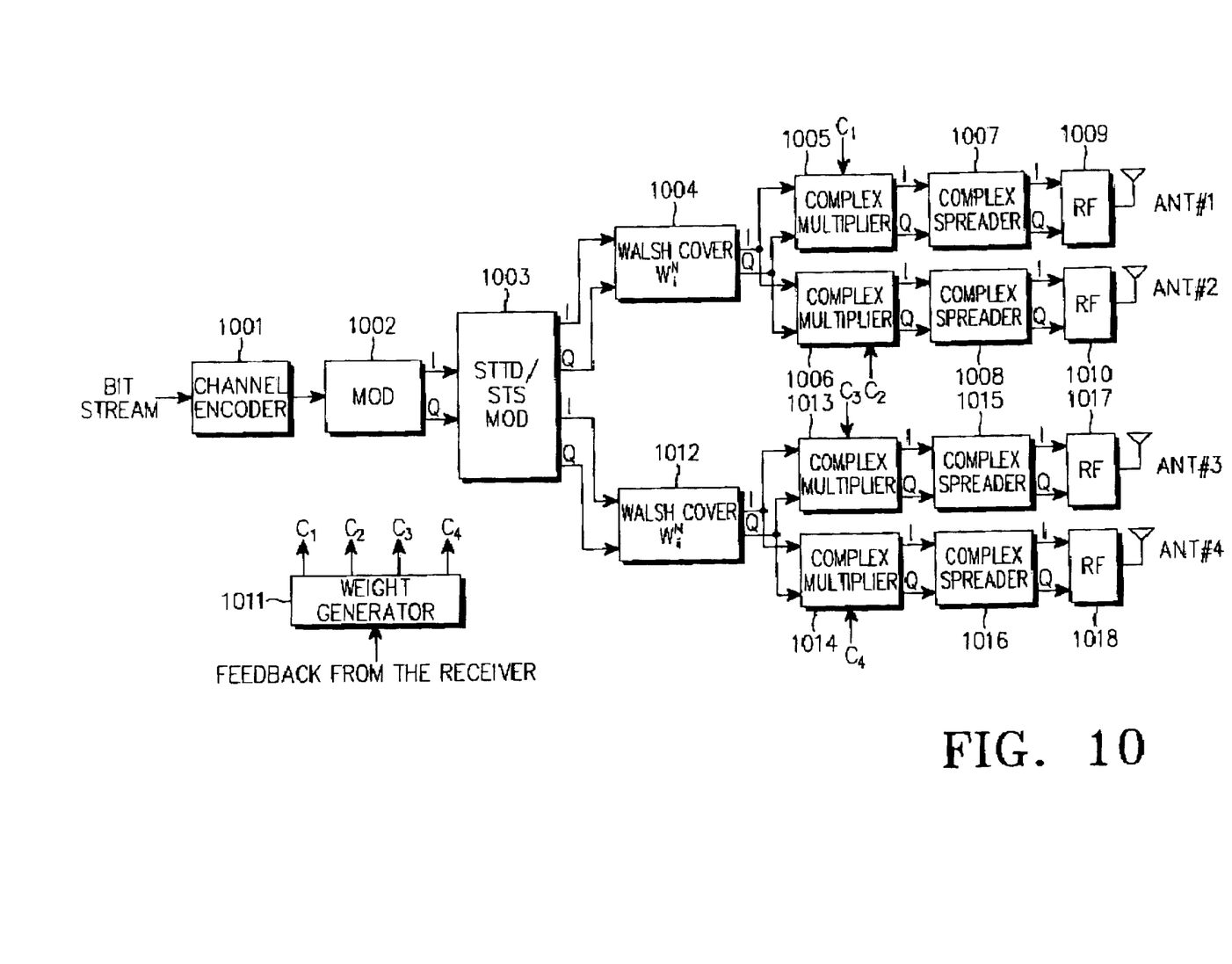
FIG. 10 illustrates a transmit antenna diversity apparatus with four antennas according to another embodiment of the present invention, in which the open loop antenna diversity apparatus is connected in series with the closed loop antenna diversity apparatus.

FIG. 10 illustrates a structure of a base station transmission apparatus with four antennas according to another embodiment of the present invention, in which an open loop antenna diversity apparatus is connected in series with a closed loop antenna diversity apparatus so as to obtain both a gain of the open loop antenna diversity and a gain of the closed loop antenna diversity.

Referring to FIG. 10, a channel encoder 1001 encodes an input bit stream into coded symbols. A modulator 1002 maps the coded symbols from the channel encoder 1001 into an M-ary complex symbol. Here, the modulator 1001 serves as a QPSK, 8-PSK or 16-QAM modulator according to its data rate. An STTD/STS modulator 1003 modulates the complex symbol (I and Q sequences) output from the modulator 1002 into two different complex symbols. A detailed operation of the STTD/STS modulator 1003 has been described with reference to FIGS. 4 and 5. A weight generator 1011 generates weights $C_1$, $C_2$, $C_3$ and $C_4$ to be applied to the respective antennas, based on forward channel information fed back from the mobile station.

A Walsh cover part 1004 spreads one complex symbol from the STTD/STS modulator 1003 by multiplying it by a Walsh orthogonal code assigned to the mobile station. A complex multiplier 1005 multiplies the output of the Walsh cover part 1004 by the weight $C_1$ from the weight generator 1011, and a complex multiplier 1006 multiplies the output of the Walsh cover part 1004 by the weight $C_2$ from the weight generator 1011. Complex spreaders 1007 and 1008 complex-spread the outputs of the associated complex multipliers 1005 and 1006, respectively. A detailed operation of the complex spreaders 1007 and 1008 has been described with reference to FIG. 3. RF parts 1009 and 1010 shift the outputs of their associated complex spreaders 1007 and 1008 to an RF band. The shifted RF band signals are transmitted to the mobile station through their associated antennas ANT1 and ANT2.

A Walsh cover part 1012 spreads another complex symbol from the STTD/STS modulator 1003 by multiplying it by the Walsh code assigned to the mobile station. A complex multiplier 1013 multiplies the output of the Walsh cover part 1012 by the weight $C_3$ from the weight generator 1011, and a complex multiplier 1014 multiplies the output of the Walsh cover part 1012 by the weight $C_4$ from the weight generator 1011. Complex spreaders 1015 and 1016 complex-spread the outputs of the associated complex multipliers 1013 and 1014, respectively. A detailed operation of the complex spreaders 1015 and 1016 has been described with reference to FIG. 3. RF parts 1017 and 1018 shift the outputs of their associated complex spreaders 1015 and 1016 to an RF band. The shifted RF band signals are transmitted to the mobile station through their associated antennas ANT3 and ANT4.

An operation of the structure shown in FIG. 10 will be described below. The coded symbols output from the channel encoder 1001 are modulated into a complex symbol by the modulator 1002. Further, the complex symbol is modulated into two different complex symbols by the STTD/STS modulator 1003. Here, one complex symbol out of the two complex symbols output from the STTD/STS modulator 1003 is provided to a first transmission part, while another complex symbol is provided to a second transmission part. The first transmission part includes the Walsh cover part 1004, the complex multipliers 1005 and 1006, the complex spreaders 1007 and 1008, and the RF parts 1009 and 1010. The second transmission part includes the Walsh cover part 1012, the complex multipliers 1013 and 1014, the complex spreaders 1015 and 1016, and the RF parts 1017 and 1018. The two complex signals output from the first transmission part are transmitted through the first and second antennas ANT1 and ANT2, while the two complex signals output from the second transmission part are transmitted through the third and fourth antennas ANT3 and ANT4. That is, the base station transmits a signal to the mobile station through a total of 4 antennas.

In IS-2000 Release A for the cdma2000 system, a common pilot channel is transmitted through a first antenna ANT1, while a diversity pilot channel is transmitted through a second antenna ANT2. The mobile station calculates weight information for the two antennas ANT1 and ANT2 using the common pilot channel and the diversity pilot channel, and then transmits the calculated weight information to the base station. If the structure of FIG. 10 is applied to a system supporting the IS-200 Release A, an auxiliary pilot channel is assigned to the third antenna ANT3 and an auxiliary diversity pilot channel is assigned to the fourth antenna ANT4. The mobile station calculates weight information for the third and fourth antennas ANT3 and ANT4 using the auxiliary pilot channel and the auxiliary diversity pilot channel, and then transmits the calculated weight information to the base station. The weight generator 1011 shown in FIG. 10 generates the weights $C_1$, $C_2$, $C_3$ and $C_4$ to be applied to the respective antennas, based on the weight information for the first to fourth antennas ANT1–ANT4. The base station structure shown in FIG. 10 transmits each of the two channels separated by the STTD/STS modulator 1003 through two associated antennas, thereby guaranteeing a higher gain than when only the open loop antenna diversity is used.

Figure 11:
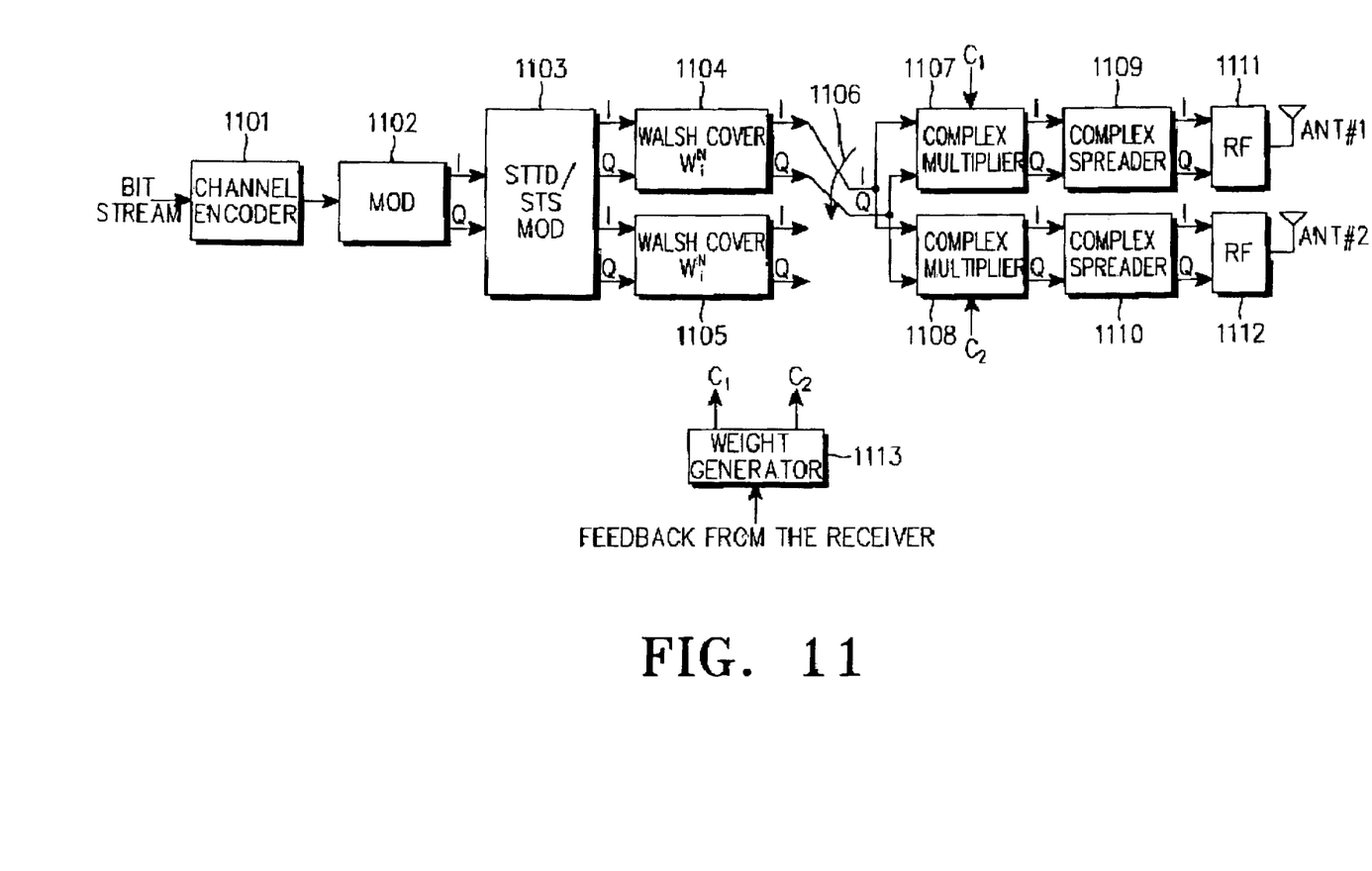
FIG. 11 illustrates a transmit antenna diversity apparatus with two antennas according to another embodiment of the present invention, in which the open loop antenna diversity apparatus is connected in serial with the closed loop antenna diversity apparatus.

FIG. 11 illustrates a structure of a transmit antenna diversity apparatus with two antennas according to another embodiment of the present invention, in which an open loop antenna diversity apparatus is connected in serial with a closed loop antenna diversity apparatus so as to obtain both a gain of the open loop antenna diversity and a gain of the closed loop antenna diversity.

Referring to FIG. 11, a channel encoder 1101 encodes an input bit stream into coded symbols. A modulator 1102 maps the coded symbols output from the channel encoder 1101 into an M-ary complex symbol. Here, the modulator 1102 serves as a QPSK, 8-PSK or 16-QAM modulator according to its data rate. An STTD/STS modulator 1103 modulates the complex symbol (I and Q sequences) output from the modulator 1102 into two different complex symbols. A detailed operation of the STTD/STS modulator 1003 has been described with reference to FIGS. 4 and 5. A weight generator 1113 generates weights $C_1$ and $C_2$ to be applied to the respective antennas, based on forward channel information fed back from the mobile station.

A switch 1106 selects one of the complex symbols output from a Walsh cover part 1104 and a Walsh cover part 1105, and provides the selected complex symbol to complex multipliers 1107 and 1108. The switch 1106, under the control of an upper layer controller (not shown), performs a switching operation at a 1× or 2× Walsh chip rate. When the switch 1106 operates at the 1× Walsh chip rate, only half of the output symbols of the STTD/STS modulator 1103 are transmitted. However, when the switch 1106 operates at the 2× Walsh chip rate, all of the output symbols of the STTD/STS modulator 1103 are transmitted. Further, the switch 1106 can also perform the switching operation in a unit of a predetermined number of chips (e.g., in a symbol unit).

The complex multiplier 1107 multiplies the complex symbol provided from the switch 1106 by the weight $C_1$ output from the weight generator 1113. The complex multiplier 1108 multiplies the complex symbol received from the switch 1106 by the weight $C_2$ provided from the weight generator 1113. Complex spreader 1109 and 1110 complex-spread the outputs of their associated complex multipliers 1107 and 1108. A detailed operation of the complex spreaders 1109 and 1110 has been described with reference to FIG. 3. RF parts 1111 and 1112 shift the outputs of their associated complex spreaders 1109 and 1110 to an RF band. The shifted RF band signals are transmitted to the mobile station through the associated antennas ANT1 and ANT2.

An operation of the structure shown in FIG. 11 will be described below. The coded symbols output from the channel encoder 1101 are modulated into a complex symbol (I and Q sequences) by the modulator 1102. Further, the complex symbol is modulated into two different complex symbols by the STTD/STS modulator 1103, and the two complex symbols subjected to orthogonal spreading through the Walsh cover parts 1104 and 1105, respectively. The two spread complex symbols are alternately provided to the complex multipliers 1107 and 1108 through the switch 1106. The switch 1106 can either perform the switching operation at a 1× or 2× Walsh chip rate or perform the switching operation in a symbol unit. Thereafter, the outputs of the switch 1106 are multiplied by the weights $C_1$ and $C_2$ by the complex multipliers 1107 and 1108. The weighted complex signals are subject to complex spreading, and then shifted to an RF band. The shifted RF band signals are transmitted through the first and second antennas ANT1 and ANT2. The structure of FIG. 11 provides a serial connection-type antenna diversity technique capable of obtaining both a gain of the open loop antenna diversity and a gain of the closed loop antenna diversity, while minimizing the hardware complexity.

As described above, when the CDMA mobile communication system uses a combined antenna diversity apparatus of the closed loop antenna diversity apparatus and the open loop antenna diversity apparatus, it is possible to prevent abrupt performance deterioration in spite of an increase in a moving speed of the mobile station. Therefore, compared with a system not using the antenna diversity apparatus, the system according to the present invention shows superior performance over the whole speed rage of the mobile station, and can prevent performance degradation at a specific speed, which may be caused in a system using only the open loop or closed loop antenna diversity apparatus. As a result, compared with when only the open loop or closed loop antenna diversity apparatus is used, it is possible to increase data throughput of the system and expand an available service area.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A base station transmission apparatus in a mobile communication system using transmit antenna diversity between a base station with a plurality of antennas and a mobile station, comprising:

a modulator for generating a complex symbol in response to a coded symbol;

a first spreader for generating a plurality of different complex symbols in response to the complex symbol from the modulator, and generating a plurality of first orthogonal spreading symbols by spreading the plurality of the generated complex symbols with a first orthogonal code assigned to the mobile station;

a second spreader for generating a plurality of same complex symbols in response to the complex symbol from the modulator, spreading the plurality of same complex symbols with a second orthogonal code, which is assigned to the mobile station, being different from the first orthogonal code and generating a plurality of second orthogonal spreading symbols, by multiplying the orthogonal spreading symbols by weights for the antennas, determined based on feedback information, received from the mobile station, indicating reception status of a base station signal;

a plurality of summers for summing up the first orthogonal spreading symbols from the first spreader and the second orthogonal spreading symbols from the second spreader; and a transmitter for, shifting the orthogonal spreading symbols to a radio frequency band, and transmitting the shifted symbols through the antennas.

2. The base station transmission apparatus as claimed in claim 1, wherein the first spreader comprises;

a diversity modulator for generating the plurality of different complex symbols in response to the complex symbol from the modulator; and a plurality of Walsh cover parts for generating the plurality of the first orthogonal spreading symbols by spreading the plurality of different complex symbols from the diversity modulator with the first orthogonal code.

3. The base station transmission apparatus as claimed in claim 2, wherein the diversity modulator is one of an STTD (Space-Time Transmit Diversity) modulator and an STS (Space Time Spreader) modulator.

4. The base station transmission apparatus as claimed in claim 1, wherein the second spreader comprises:

a plurality of Walsh cover parts for generating the plurality of the orthogonal spreading symbols by spreading the plurality of complex symbols from the modulator with the second orthogonal code; and a complex multiplier for generating the plurality of the second orthogonal spreading symbols by multiplying the plurality of the orthogonal spreading symbols from the Walsh cover parts by the associated weights.

5. The base station transmission apparatus as claimed in claim 1, wherein the feedback information indicates a reception phase of a base station signal at the mobile station.

6. A base station transmission apparatus in a mobile communication system using transmit antenna diversity between a base station with a plurality of antennas and a mobile station, comprising:

a modulator for generating a complex symbol in response to a coded symbol;

a serial-to-parallel converter for outputting two complex symbols with a reduced symbol rate by demultiplexing the complex symbol from the modulator;

a first spreader for generating a plurality of different complex symbols in response to one complex symbol from the serial-to-parallel converter, and generating a plurality of first sub-orthogonal spreading symbols by spreading the plurality of complex symbols with a first sub-orthogonal code created from one orthogonal code assigned to the mobile station;

a second spreader for generating a plurality of same complex symbols in response to another complex symbol from the serial-to-parallel converter, spreading the plurality of same complex symbols with a second sub-orthogonal code being different from the first sub-orthogonal code, and generating a plurality of second sub-orthogonal spreading symbols by multiplying the sub-orthogonal spreading symbols by weights for the antennas, determine based on feedback information, received from the mobile station, indicating reception status of a base station signal;

a plurality of summers for summing up the first sub-orthogonal spreading symbols from the first spreader and the second sub-orthogonal spreading symbols from the second spreader; and a transmitter for shifting the summed sub-orthogonal spreading symbols to a radio frequency band, and transmitting the shifted symbols through the antennas.

7. The base station transmission apparatus as claimed in claim 6, wherein the first spreader comprises;

a diversity modulator for generating the plurality of different complex symbols in response to said one complex symbol from the serial-to-parallel converter; and a plurality of Walsh cover parts for generating the plurality of first sub-orthogonal spreading symbols by spreading the plurality of the complex symbols from the diversity modulator with the first sub-orthogonal code.

8. The base station transmission apparatus as claimed in claim 7, wherein the diversity modulator is one of an STTD (Space-Time Transmit Diversity) modulator and an STS (Space Time Spreader) modulator.

9. The base station transmission apparatus as claimed in claim 6, wherein the second spreader comprises:

a plurality of Walsh cover parts for generating orthogonal spreading symbols by spreading said another complex symbol from the serial-to-parallel converter with the second sub-orthogonal code; and a complex multiplier for generating the plurality of second sub-orthogonal spreading symbols by multiplying the plurality of the orthogonal spreading symbols from the Walsh cover parts by the associated weight.

10. A base station transmission apparatus in a mobile communication system using transmit antenna diversity between a base station with a plurality of antennas and a mobile station, comprising:

a modulator for generating a complex symbol in response to a coded symbol;

a diversity modulator for generating a plurality of different complex symbols in response to the complex symbol from the modulator;

a plurality of Walsh cover parts for generating a plurality of orthogonal spreading symbols by spreading the plurality of complex symbols with an orthogonal code assigned to the mobile station; and a plurality of transmitters, a number of the transmitters being equal to a number of the orthogonal spreading symbols output from the Walsh cover parts, for generating a plurality of weighted orthogonal spreading symbols by multiplying one complex symbol from the Walsh cover part by weights for the antennas, determined based on feedback information, received from the mobile station, indicating reception status of a base station signal, shifting the weighted orthogonal spreading symbols to a radio frequency band, and transmitting the shifted symbols through the antennas associated with the weights.

11. The base station transmission apparatus as claimed in claim 10, wherein the diversity modulator is one of an STTD (Space-Time Transmit Diversity) modulator and an STS (Space Time Spreader) modulator.

12. The base station transmission apparatus as claimed in claim 10, wherein the transmitter comprises:

a plurality of complex multipliers for generating a plurality of weighted orthogonal spreading symbols by multiplying said one orthogonal spreading symbol from the Walsh cover part by the weights; and an RF (Radio Frequency) part for shifting the weighted orthogonal spreading symbols to a radio frequency band, and transmitting the shifted symbols through the antennas.

13. A base station transmission apparatus in a mobile communication system using transmit antenna diversity between a base station with a plurality of antennas and a mobile station, comprising:

a modulator for generating a complex symbol in response to a coded symbol;

a diversity modulator for generating a plurality of different complex symbols in response to the complex symbol from the modulator;

a plurality of Walsh cover parts for generating a plurality of orthogonal spreading symbols by spreading the plurality of complex symbols from the diversity modulator with an orthogonal code assigned to the mobile station;

a switch for sequentially selecting the plurality of orthogonal spreading symbols from the spreader in a given period;

a complex multiplier for generating a plurality of weighted orthogonal spreading symbols by multiplying the orthogonal spreading symbol output from the switch by weights for the antennas, determined based on feedback information, received from the mobile station, indicating reception status of a base station signal; and a RF part for shifting the weighted orthogonal spreading symbols to a radio frequency band, and transmitting the shifted symbols through the antennas.

14. The base station transmission apparatus as claimed in claim 13, wherein the diversity modulator is one of an STTD (Space-Time Transmit Diversity) modulator and an STS (Space Time Spreader) modulator.

15. The base station transmission apparatus as claimed in claim 13, wherein the feedback information indicates a reception phase of a base station signal at the mobile station.

16. A base station transmission method in a mobile communication system using transmit antenna diversity between a base station with a plurality of antennas and a mobile station, comprising the steps of:

determining weights for the plurality of antennas based on feedback information, received from the mobile station, indicating reception status of a base station signal;

generating a complex symbol in response to a coded symbol;

generating a plurality of different complex symbols in response to the complex symbol, and generating a plurality of first orthogonal spreading symbols by spreading the plurality of generated complex symbols with a first orthogonal code assigned to the mobile station;

generating a plurality of same complex symbols in response to the complex symbol, spreading the plurality of same complex symbols with a second orthogonal code being different from the first orthogonal code, and generating a plurality of second orthogonal spreading symbols by multiplying orthogonal spreading symbols by the determined weights;

summing up the first orthogonal spreading symbols and the second orthogonal spreading symbols; and shifting the summed orthogonal spreading symbols to a radio frequency band, and transmitting the shifted symbols through the antennas.

17. A base station transmission method in a mobile communication system using transmit antenna diversity between a base station with a plurality of antennas and a mobile station, comprising the steps of:

determining weights for the plurality of antennas based on feedback information, received from the mobile station, indicating reception status of a base station signal;

generating a complex symbol in response to a coded symbol;

generating two complex symbols with a symbol rate reduced by demultiplexing the complex symbol;

generating a plurality of different complex symbols in response to one complex symbol out of the two complex symbols, and generating a plurality of first sub-orthogonal spreading symbols by spreading the plurality of different complex symbols with a first sub-orthogonal code created from one orthogonal code assigned to the mobile station;

generating a plurality of same complex symbols in response to another complex symbol out of the two complex symbols, spreading the plurality of same complex symbols with a second sub-orthogonal code being different from the first sub-orthogonal code, and generating a plurality of second sub-orthogonal spreading symbols by multiplying orthogonal spreading symbols by the determined weights;

summing up the first sub-orthogonal spreading symbols and the second sub-orthogonal spreading symbols; and shifting the summed sub-orthogonal spreading symbols to a radio frequency band, and transmitting the shifted symbols through the antennas.

18. A base station transmission method in a mobile communication system using transmit antenna diversity between a base station with a plurality of antennas and a mobile station, comprising the steps of:

determining weights for the plurality of antennas based on feedback information, received from the mobile station, indicating reception status of a base station signal;

generating a complex symbol in response to a coded symbol;

generating a plurality of two different complex symbols in response to the complex symbol;

generating first and second orthogonal spreading symbols by spreading the two different complex symbols with an orthogonal code assigned to the mobile station;

generating a plurality of weighted orthogonal spreading symbols by multiplying the first orthogonal spreading symbol by first weights out of the determined weights, shifting the weighted orthogonal spreading symbols to a radio frequency band, and transmitting the shifted symbols through the antennas associated with the first weights; and generating a plurality of weighted orthogonal spreading symbols by multiplying the second orthogonal spreading symbol by second weights out of the determined weights, shifting the weighted orthogonal spreading symbols to a radio frequency band, and transmitting the shifted symbols through the antennas associated with the second weights.

19. A base station transmission method in a mobile communication system using transmit antenna diversity between a base station with a plurality of antennas and a mobile station, comprising the steps of:

determining weights for the plurality of antennas based on feedback information, received from the mobile station, indicating reception status of a base station signal;

generating a complex symbol in response to a coded symbol;

generating a plurality of different complex symbols in response to the complex symbol;

generating a plurality of orthogonal spreading symbols by spreading the plurality of complex symbols with an orthogonal code assigned to the mobile station;

alternately selecting the plurality of orthogonal spreading symbols in a given period;

generating a plurality of weighted orthogonal spreading symbols by multiplying the selected orthogonal spreading symbol by the determined weights; and shifting the weighted orthogonal spreading symbols to a radio frequency band, and transmitting the shifted symbols through the antennas.

* * * * *